June 28, 1927.
E. ROUCKA
1,633,713
COMPOUND SYSTEM FOR TRANSMITTING A PLURALITY OF VALUES
Filed Jan. 15, 1924
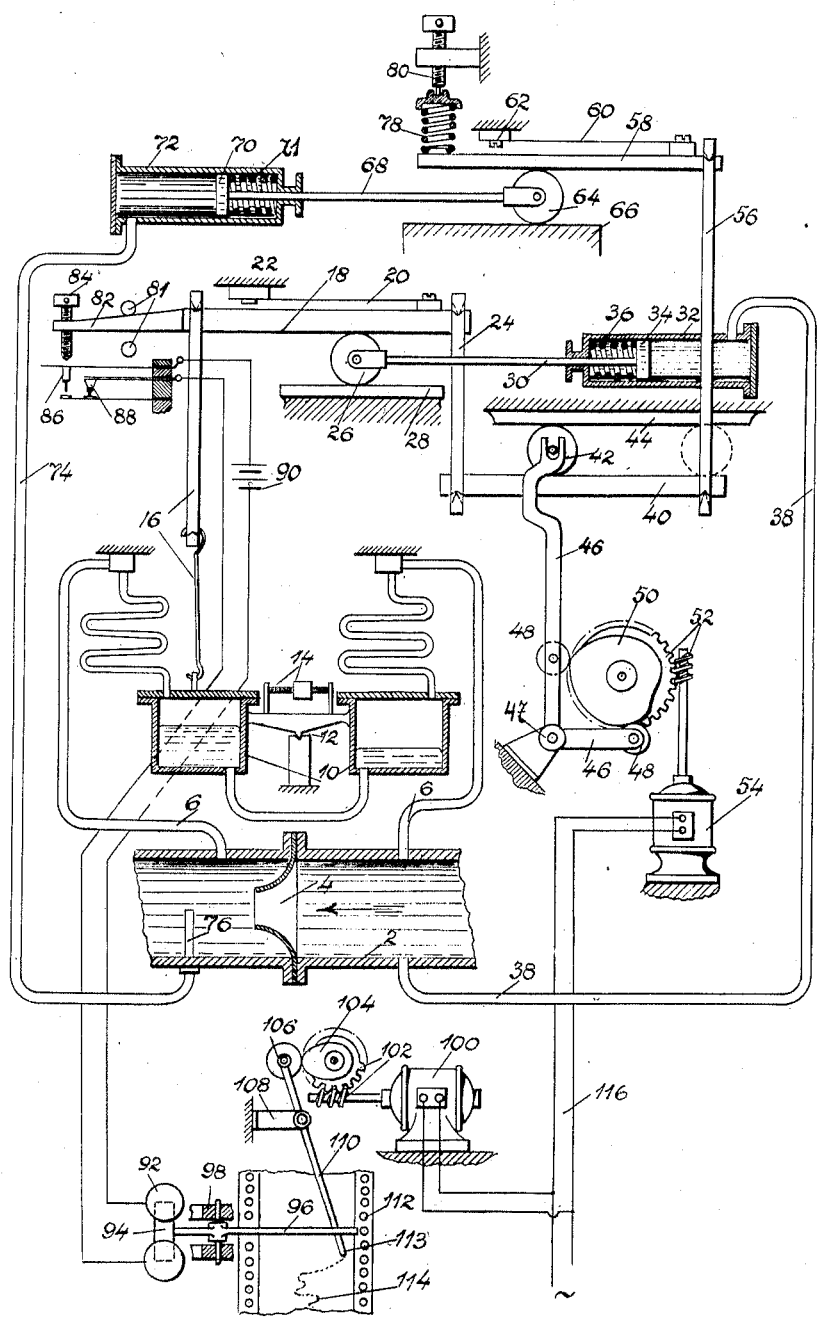
INVENTOR
*Erich Roucka*
BY
*Everett H. Rook*
ATTORNEYS Patented June 28, 1927.

UNITED STATES PATENT OFFICE.

ERICH ROUČKA, OF BLANSKO, CZECHOSLOVAKIA.

COMPOUND SYSTEM FOR TRANSMITTING A PLURALITY OF VALUES.

Application filed January 15, 1924, Serial No. 686,329, and in Czechoslovakia January 15, 1923.

This invention relates in general to a system for transmitting a variable value such as a quantity or condition by means of impulses of auxiliary energy at different time positions in equal intervals of time dependent upon the magnitude of the condition as functions or a measure of said value. More particularly the invention relates to a system of this character for compounding the effects of a plurality of values and indicating or transmitting the resultant effect or value of a plurality of component values, such for instance as the flow of a fluid, the pressure thereof and the temperature.

The primary object of the invention is to provide a system of the character described including a lever or lever system the leverage of which is varied in accordance with each of the component values and cooperating with an auxiliary value regularly variable in cycles of equal intervals of time, said lever system cooperating with means for producing impulses of auxiliary energy, whereby impulses of auxiliary energy are produced at different time positions in corresponding intervals of time as functions of the resultant effect or value produced by compound action of all of said plurality of component values.

Other objects are to provide such a system in which the leverage of the system is varied in cycles of equal intervals of time to control production of impulses of auxiliary energy the time positions of which in corresponding intervals indicate or are functions of the resultant effect of the component values; to provide such a system particularly adapted for indicating or transmitting the component effect of a plurality of fluid values, and to obtain other results and advantages as may be brought out by the following description.

In the accompanying drawing I have schematically shown a system embodying the invention particularly adapted for use in indicating, measuring or transmitting variations in the resultant effect or value produced by the compound effects of the flow of a fluid, the pressure thereof and the temperature, but it will be understood that the invention is susceptible of use in systems for measuring or transmitting variations in other values.

In said drawings,
Figure 1 is a partial section and partial side elevation of a system of apparatus embodying the invention, and
Figure 2 is a transverse vertical sectional view, taken on the line 2—2 of Figure 1.

Specifically describing the embodiment of the invention shown on the drawings, the reference character 2 designates a conduit through which flows steam, the flow of which is the value to be measured in the present instance. A flow resistance device 4 is arranged within the conduit 2, and a device 10 sensitive to differences in pressure of the fluid at opposite sides of the device 4 is connected by means of pipes 6 to the conduit 2. The device 10 is of known construction and includes two chambers containing mercury and connected by a tube, said chambers being balanced on a fulcrum 12. At the inlet side of the conduit 2 is connected a pipe 38 which conducts the fluid to a cylinder 32 behind a piston 34 so that said piston is sensitive to the pressure of the incoming fluid. A spring 36 is arranged to oppose the effect of the fluid pressure on the piston 34.

A temperature responsive device 76, which may contain a temperature responsive fluid, is arranged within the conduit 2 and is connected by a pipe 74 to a cylinder 72 behind a piston 70 so that the piston 70 is sensitive to variations in temperature of the fluid in the conduit 2. A spring 71 opposes the effect of the pressure of the fluid in the cylinder 72 on the piston 70.

One of the chambers of the pressure difference responsive device 10 is connected by a link 16 to one end of a lever 18 mounted on a fulcrum roller 26 which is rotatable on an axle 260 carrying two bearing rollers 280 movable on a guide support 28. The other end of said lever 18 is connected by a link 24 to one end of a lever 40 fulcrumed on a roller 42 movable over a fixed support 44 in a manner similar to the arrangement of roller 26 on support 28. The other end of said lever 40 is connected by a link 56 to one end of a lever 58 fulcrumed on a roller 64 movable as are the rollers 26 and 42 over a fixed support 66. The other end of the lever 58 is engaged by a compression spring 78 the pressure of which is variable by means of a set screw 80. The two levers 18 and 58 are maintained against longitudinal movement by the respective flexible strips 20 and 60 one end of each of which is connected to the respective lever and the other end of each of which is connected to the respective fixed support 22 and 62.

The fulcrum roller 26 of the lever 18 is movable by means of the piston 34 through a rod 30 connected to axle 260 whereby the leverage of the lever 18 is varied in accordance with variations in the pressure of the incoming fluid. The fulcrum roller 64 is similarly moved by the piston 70 through a rod 68 so that the leverage of the lever 58 is varied in accordance with variations in the temperature of the fluid in the conduit 2.

In accordance with the invention, the lever system so far described cooperates with an auxiliary value regularly variable in cycles of equal regular intervals of time, said auxiliary value comprising in the present instance the force of spring 78 and serving to compensate the forces produced by the original values in their respective sensitive devices, in the present instance the pressure difference in the device 10, the pressure in the device 32, 34 and the temperature in the device 70, 72. For this purpose, the axle of the fulcrum roller 42 has a pin and slot connection with one end of a bell crank lever 46 pivotally mounted intermediate its ends on a fixed support as at 47. The arms of the bell crank lever 46 are provided with the respective rollers 48 arranged substantially equidistantly from the pivot of the lever, said rollers being adapted to follow the cam 50 driven through worm and worm wheel gearing 52 by a motor 54. In the present instance this motor is electric and synchronous, and is connected to a source of alternating current by means of the wires 116. The motor 54 is constantly driven so that the fulcrum roller 42 is constantly moved back and forth longitudinally of the lever 40 in regular cycles of equal intervals of time each determined by one revolution of the cam 50. It will be noted that this movement of the roller 42 varies the leverage of the lever 40 which in turn influences the lever 58 so as to vary the pressure of the spring 78. At some moment during each interval of time determined by one revolution of the cam 50 the force actuating the pressure difference sensitive device 10 is compensated by the pressure of the spring 78 so that the lever 18 is moved about its fulcrum 26. It will be noted that the pressure of the spring 78 is also influenced by the movable fulcrums 26 and 64 of the levers 18 and 58, so that the moment of compensation between the force of the spring 78 and the device 10 is also varied by variations in the pressure of the incoming fluid and the temperature thereof. In other words, the lever 18 is moved in accordance with the resultant effect or value produced by the compound action of all of the component values of the fluid flowing through the conduit 2.

The time position of the movement of the lever 18 in an interval of time determined by a revolution of the cam 50 is a function of the said resultant effect of the component values, it being understood that this time position will vary in accordance with the variations in the component values. In accordance with the invention, means is provided to cooperate with the lever system above described to produce or control production of impulses of auxiliary energy which impulses are utilized to actuate a receiving or measuring means in accordance with the time positions of said impulses in corresponding intervals of time. In the present instance the auxiliary energy is electric and represented by the source of electricity 90. The end of the lever 18 connected to the pressure difference responsive device 10 carries an adjustable screw 84 adapted to cooperate with a switch mechanism 86, 88 to control the circuit through the source 90 and the receiving means, so that upon each movement of the lever 18 in accordance with the resultant effect of the component values, the screw 84 is forced into engagement with the switch mechanism so as to close the circuit through the source 90 and the receiving means to produce an impulse of auxiliary energy for actuating the receiving means.

The receiving means itself may be of any suitable construction, but in the present instance is the same as heretofore described in several of my copending applications. Said means includes a synchronous electric motor 100 which may be connected to the same source of current as the motor 54 and which drives through worm and worm wheel gearing 102 a cam 104 in such a manner that the said cam moves synchronously with the cam 50. A lever 110 is pivotally mounted intermediate its ends on a fixed support 108 and carries at one end a roller 106 which follows the cam 104. The other end of the lever 110 carries a pen point 113 adapted to cooperate with a traveling record strip 112. The pen point 113 is normally spaced from the record strip 112 and is constantly oscillated transversely of the strip by the cam 104. A lever 96 is pivotally mounted intermediate its ends on a fixed support with one end overlying the end of the lever 110 carrying the pen point. The other end of the lever 96 carries an armature 94 cooperating with electromagnets 92 connected in circuit with the source 90 of auxiliary energy. With this construction, upon each impulse of auxiliary energy, the electromagnets 92 are energized so as to attract the armature 94 and oscillate the lever 96 to force the pen point 113 into engagement with the record strip 112, whereby a dot is produced on the record strip indicating the time position of the impulse in the interval of time determined by the cams 50 and 104. The record of the time positions of the various impulses consists of a continuous line 114 of dots, each of which represents the resultant effect or value produced by the compound action of the pressure difference of the fluid, the temperature of the fluid and the pressure thereof at the moment of compensation of the forces produced by each of these values by the regularly variable auxiliary value produced by the spring 78 and the movable fulcrum roller 42.

It should be understood that the present application is based particularly upon the transmitting apparatus, the general combination of transmitting apparatus of this type and receiving means to cooperate therewith being described and claimed in my copending application Serial No. 625,153, filed March 14, 1923. Impulse transmitting systems of this general character are also disclosed in Patents Nos. 1,412,586 and 1,434,064 of April 11, 1912, and October 31, 1922, respectively.

While I have shown and described mechanism embodying certain details of construction, it will be understood that it is within the scope of the invention to modify or change these details or utilize other mechanism within the skill of a mechanic to produce the objects of the invention. Therefore, I do not desire to be understood as limiting myself except as required by the following claims when construed in the light of the prior art.

Having thus described the invention, what I claim is:

1. In a system for transmitting variable conditions, the combination of a plurality of sensitive devices each movable responsive to and corresponding to variations in the magnitude of one of a plurality of different component conditions, a lever system including a plurality of levers, means connecting one end of one of said levers to one of said devices, means connecting the other end of said lever to one end of a second lever, means connecting the other end of said second lever to one end of a third lever, means for applying a constant auxiliary force to the other end of said third lever, a movable fulcrum intermediate the end of each of said levers, means for varying the position of the fulcrum of the second lever in regular cycles of equal intervals of time, means cooperating with the first-mentioned end of said first-mentioned lever for producing impulses of auxiliary energy, and operative connections between each of the fulcrums of the first-mentioned lever and the third lever and two others of said sensitive devices respectively for varying the positions of said fulcrums corresponding to the magnitudes of the respective component conditions, whereby during each of said cycles an impulse of auxiliary energy is produced the time position of which in said cycle is a function of the resultant value produced by compound action of said component conditions.

2. In a system for transmitting variable conditions, the combination of a plurality of sensitive devices each movable responsive to and corresponding to variations in the magnitude of one of a plurality of different component conditions, a lever system including a plurality of levers, means interconnecting said levers so that movement of one influences the others, means for connecting one of said sensitive devices to one of said levers, means actuated by each of the other sensitve devices for varying the leverage of said lever system in accordance with variations in the magnitude of the respective condition, means for applying a constant auxiliary force to said lever system to compensate the forces produced by said sensitive devices in said lever system, means cooperating with said lever system for producing impulses of auxiliary energy at the moments of compensation, and means for regularly varying the relation of said constant auxiliary force to said lever system in cycles of equal intervals of time, whereby during each of said cycles an impulse of auxiliary energy is produced at a time position in the corresponding cycle as a function of the resultant value produced by compound action of said component conditions.

ERICH ROUČKA.